(12) United States Patent
Chandler et al.

(10) Patent No.: US 10,272,421 B2
(45) Date of Patent: Apr. 30, 2019

(54) CATALYTIC WALL-FLOW FILTER HAVING A MEMBRANE

(71) Applicant: Johnson Matthey Public Limited Company, London (GB)

(72) Inventors: Guy Richard Chandler, Royston (GB); Paul Richard Phillips, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/193,221

(22) Filed: Jun. 27, 2016

(65) Prior Publication Data

US 2016/0375429 A1    Dec. 29, 2016

Related U.S. Application Data

(60) Provisional application No. 62/185,695, filed on Jun. 28, 2015.

(51) Int. Cl.
*B01J 29/70* (2006.01)
*B01J 23/10* (2006.01)
(Continued)

(52) U.S. Cl.
CPC ...... *B01J 29/7015* (2013.01); *B01D 46/2455* (2013.01); *B01D 46/2474* (2013.01);
(Continued)

(58) Field of Classification Search
CPC ........ B01J 29/7015; B01J 35/04; B01J 23/10; B01J 29/70; B01J 29/50; B01J 35/0006; B01J 37/0201; B01J 37/0246; B01J 29/064; B01J 29/076; B01J 29/72; B01J 29/743; B01J 29/763; B01J 29/83; B01J 29/84; B01J 29/85; B01D 53/9418; B01D 53/9454; B01D 2255/502; B01D 2255/504;
(Continued)

(56) References Cited

U.S. PATENT DOCUMENTS

| | | |
|---|---|---|
| 5,089,237 A | 2/1992 | Schuster et al. |
| 5,114,581 A | 5/1992 | Goldsmith et al. |

(Continued)

FOREIGN PATENT DOCUMENTS

| | | |
|---|---|---|
| DE | 102010006289 A1 | 8/2011 |
| WO | 2014199210 A1 | 12/2014 |

*Primary Examiner* — Daniel McCracken
(74) *Attorney, Agent, or Firm* — Gary D. Mangels

(57) ABSTRACT

The present invention relates to a catalytic wall-flow monolith for use in an emission treatment system, the monolith comprising a porous substrate and having a first face and a second face defining a longitudinal direction therebetween and first and second pluralities of channels extending in the longitudinal direction, the first plurality of channels provides a first plurality of inner surfaces and is open at the first face and closed at the second face, and the second plurality of channels is open at the second face and closed at the first face, a first catalytic material is distributed within the porous substrate, a microporous membrane is provided in the first plurality of channels on a first portion, extending in the longitudinal direction, of the first plurality of inner surfaces, and the first portion extends from the first face for 75 to 95% of a length of the first plurality of channels.

8 Claims, 5 Drawing Sheets

A-A line cross-sectional view

(51) Int. Cl.

| | |
|---|---|
| *B01D 53/94* | (2006.01) |
| *B01J 35/00* | (2006.01) |
| *B01J 37/02* | (2006.01) |
| *B01J 35/04* | (2006.01) |
| *B01J 29/50* | (2006.01) |
| *B01D 46/24* | (2006.01) |
| *F01N 3/022* | (2006.01) |
| *F01N 3/035* | (2006.01) |
| *F01N 3/20* | (2006.01) |
| *B01J 29/064* | (2006.01) |
| *B01J 29/076* | (2006.01) |
| *B01J 29/72* | (2006.01) |
| *B01J 29/74* | (2006.01) |
| *B01J 29/76* | (2006.01) |
| *B01J 29/83* | (2006.01) |
| *B01J 29/84* | (2006.01) |
| *B01J 29/85* | (2006.01) |

(52) U.S. Cl.
CPC ....... *B01D 53/944* (2013.01); *B01D 53/9418* (2013.01); *B01D 53/9454* (2013.01); *B01J 23/10* (2013.01); *B01J 29/064* (2013.01); *B01J 29/076* (2013.01); *B01J 29/50* (2013.01); *B01J 29/70* (2013.01); *B01J 29/72* (2013.01); *B01J 29/743* (2013.01); *B01J 29/763* (2013.01); *B01J 29/83* (2013.01); *B01J 29/84* (2013.01); *B01J 29/85* (2013.01); *B01J 35/0006* (2013.01); *B01J 35/04* (2013.01); *B01J 37/0201* (2013.01); *B01J 37/0244* (2013.01); *B01J 37/0246* (2013.01); *F01N 3/0222* (2013.01); *F01N 3/035* (2013.01); *F01N 3/2066* (2013.01); *B01D 2255/502* (2013.01); *B01D 2255/504* (2013.01); *B01D 2255/9155* (2013.01); *B01D 2255/9202* (2013.01); *B01D 2258/012* (2013.01); *B01D 2325/10* (2013.01); *B01J 2229/186* (2013.01); *F01N 2240/40* (2013.01); *F01N 2250/02* (2013.01); *F01N 2330/06* (2013.01); *F01N 2330/32* (2013.01); *F01N 2330/48* (2013.01); *F01N 2330/60* (2013.01); *F01N 2510/0682* (2013.01); *Y02T 10/24* (2013.01)

(58) Field of Classification Search
CPC .... B01D 2255/9155; B01D 2255/9202; B01D 2258/012; Y02T 10/24
See application file for complete search history.

(56) References Cited

U.S. PATENT DOCUMENTS

| | | |
|---|---|---|
| 5,221,484 A | 6/1993 | Goldsmith et al. |
| 7,247,184 B2 | 7/2007 | Frost |
| 7,323,054 B2 | 1/2008 | Aderhold et al. |
| 8,071,037 B2 | 12/2011 | Harinath et al. |
| 8,367,578 B2 | 2/2013 | Collier et al. |
| 8,398,925 B2 | 3/2013 | Chiffey et al. |
| 8,404,203 B2 | 3/2013 | Bull et al. |
| 8,603,432 B2 | 12/2013 | Andersen et al. |
| 8,614,476 B2 | 12/2013 | Kim et al. |
| 8,663,587 B2 | 3/2014 | Boorse |
| 8,703,236 B2 | 4/2014 | Chandler et al. |
| 9,121,327 B2 | 9/2015 | Patchett et al. |
| 9,138,735 B2 | 9/2015 | Roberts et al. |
| 2004/0254073 A1 | 12/2004 | Wei et al. |
| 2006/0008396 A1 | 1/2006 | Wursthorn et al. |
| 2006/0057046 A1 | 3/2006 | Punke et al. |
| 2010/0290963 A1* | 11/2010 | Andersen ........... B01D 53/9418 423/213.2 |
| 2011/0182790 A1 | 7/2011 | Chandler et al. |
| 2012/0058019 A1 | 3/2012 | Mizutani et al. |
| 2012/0058020 A1 | 3/2012 | Takagi et al. |
| 2012/0070346 A1 | 3/2012 | Mizutani et al. |
| 2012/0247092 A1 | 10/2012 | Boorse |
| 2014/0140899 A1 | 5/2014 | Gabrielsson et al. |
| 2014/0170045 A1 | 6/2014 | Fedeyko et al. |

* cited by examiner

A-A line cross-sectional view

CATALYTIC WALL-FLOW FILTER HAVING A MEMBRANE

CROSS-REFERENCE TO RELATED APPLICATIONS

This claims priority to U.S. Provisional Patent Application No. 62/185,695, filed Jun. 28, 2015, which is incorporated herein by reference.

FIELD OF THE INVENTION

The present invention relates to a catalytic wall-flow monolith suitable for use in an emission treatment system, such as an automobile internal combustion exhaust system. The monolith provides an effective method of remediating engine exhaust streams.

BACKGROUND OF THE INVENTION

Emissions from internal combustion engines, including diesel engines, are limited by legislation put in place by governments worldwide. Manufacturers are seeking to meet these legislated requirements through a combination of engine design and exhaust gas after-treatment. The exhaust systems used to carry out exhaust gas after-treatment commonly comprise a series of catalysts and/or filters that are designed to carry out certain reactions that reduce the proportion of exhaust gas species limited by such legislation.

A diesel engine exhaust stream is a heterogeneous mixture which contains not only gaseous emissions such as carbon monoxide ("CO"), unburned hydrocarbons ("HC") and nitrogen oxides ("$NO_x$"), but also condensed phase materials (liquids and solids) which constitute the so-called particulates or particulate matter. Often, catalyst compositions and substrates on which the compositions are disposed are provided in diesel engine exhaust systems to convert certain or all of these exhaust components to innocuous components. For example, diesel exhaust systems can contain one or more of a diesel oxidation catalyst, a soot filter and a catalyst for the reduction of $NO_x$.

The total particulate matter emissions of diesel exhaust streams include a solid, dry, carbonaceous fraction, a so-called soot fraction. This dry carbonaceous matter contributes to the visible soot emissions commonly associated with diesel exhausts.

One key after-treatment technology in use for high particulate matter reduction is the diesel particulate filter. There are many known filter structures that are effective in removing particulate matter from diesel exhaust streams, such as honeycomb wall-flow filters, wound or packed fiber filters, open cell foams, sintered metal filters, etc. However, ceramic wall flow filters, described below, receive the most attention. These filters are capable of removing over 90% of the particulate material from diesel exhaust streams. The filter is a physical structure for removing particles from exhaust streams, and the accumulating particles will increase the back pressure from the filter on the engine. Thus the accumulating particles have to be continuously or periodically burned out of the filter to maintain an acceptable back pressure. Unfortunately, the carbon soot particles require temperatures in excess of 500° C. to burn under oxygen rich (lean) exhaust conditions. This temperature is higher than what is typically present in diesel exhaust streams.

Accordingly, it is necessary to actively burn the accumulated soot in order to promote filter regeneration. One form of active filter regeneration is to intermittently introduce additional hydrocarbon fuel into the exhaust gas and to combust this in order to increase the filter temperature. Combustion of the additional hydrocarbon fuel can be effected on the filter itself by coating the filter with a suitable combustion-promoting catalyst. A suitably catalysed filter is often referred to as a catalysed soot filter or CSF.

During active regeneration the CSF may need to reach temperatures of approximately 600° C. to permit particulate matter to be removed (combusted) at a sufficient rate. However, if during an active regeneration event, a period of low exhaust gas flow occurs, e.g. when the engine/vehicle is caused to idle, the reduced gas flow prevents heat from being removed from the CSF. This can result in parts of the filter reaching temperatures in excess of 1000° C. Such high temperatures can cause two major problems. Firstly, the catalyst can sinter, reducing its surface area and as a consequence catalyst activity is lost. Secondly, high thermal gradients can occur in the substrate leading to mechanical stress caused by differences in thermal expansion. Under extreme conditions the thermal gradients and stresses can cause substrates to crack thereby resulting in a failure of the integrity of the CSF.

Therefore, the challenge is in controlling the active regeneration of the CSF so that it can reach temperatures sufficiently high to remove particulate matter but not so high as to cause damage to the catalyst and/or the filter substrate.

As noted above diesel exhaust streams also contain $NO_x$. A proven NOx abatement technology applied to stationary sources with lean exhaust conditions is Selective Catalytic Reduction (SCR). In this process, $NO_x$ is reduced with ammonia ($NH_3$) to nitrogen ($N_2$) over a catalyst typically composed of base metals. The technology is capable of $NO_x$ reduction greater than 90%, and thus it represents one of the best approaches for achieving aggressive $NO_x$ reduction goals. SCR provides efficient conversions of $NO_x$ as long as the exhaust temperature is within the active temperature range of the catalyst.

Separate substrates, each containing catalysts to address discrete components of the exhaust can be provided in an exhaust system. However, use of fewer substrates is desirable to reduce the overall size of the system, to ease the assembly of the system, and to reduce the overall cost of the system. One approach to achieve this goal is to coat the soot filter with a catalyst composition effective for the conversion of $NO_x$ to innocuous components. With this approach, the catalysed soot filter assumes two catalyst functions: removal of the particulate component of the exhaust stream and conversion of the $NO_x$ component of the exhaust stream to nitrogen.

Coated soot filters that can achieve $NO_x$ reduction goals require a sufficient loading of SCR catalyst composition on the soot filter. The gradual loss of the catalytic effectiveness of the compositions that occurs over time through exposure to certain deleterious components of the exhaust stream augments the need for higher catalyst loadings of the SCR catalyst composition. However, preparation of coated soot filters with higher catalyst loadings can lead to unacceptably high back pressure within the exhaust system. Coating techniques that allow higher catalyst loadings on the wall flow filter, yet still allow the filter to maintain flow characteristics that achieve acceptable back pressures are therefore desirable.

An additional aspect for consideration in coating the wall-flow filter is the selection of the appropriate SCR catalyst composition. First, the catalyst composition must be durable so that it maintains its SCR catalytic activity even after prolonged exposure to higher temperatures that are characteristic of filter regeneration. For example, combustion of the soot fraction of the particulate matter often leads to temperatures above 700° C. Such temperatures render many commonly used SCR catalyst compositions such as mixed oxides of vanadium and titanium less catalytically effective. Second, the SCR catalyst compositions preferably have a wide enough operating temperature range so that they can accommodate the variable temperature ranges over which the vehicle operates. Temperatures below 300° C. are typically encountered, for example, at conditions of low load, or at startup. The SCR catalyst compositions are preferably capable of catalyzing the reduction of the $NO_x$ component of the exhaust to achieve $NO_x$ reduction goals, even at lower exhaust temperatures.

U.S. Pat. No. 8,617,476 discloses a honeycomb filter characterised by the amount of zeolite supported on the channel walls and the thermal conductivity of the walls.

U.S. Pat. No. 8,398,925 discloses a particulate filer substrate for an internal combustion engine. The filter substrate is coated with a washcoat having regions of different densities.

WO2005016497 discloses an exhaust treatment system.

US2012/0247092 discloses a multi-component filter for emission control.

US2014/0140899 discloses a catalysed particulate filter.

WO2011140248 discloses catalysed soot filters and emission treatment systems.

U.S. Pat. No. 5,221,484 discloses a catalytic filtration system and method.

Accordingly, it is desirable to provide an improved wall-flow monolith and/or tackle at least some of the problems associated with the prior art or, at least, to provide a commercially useful alternative thereto.

SUMMARY OF THE INVENTION

According to a first aspect there is provided a catalytic wall-flow monolith for use in an emission treatment system,
the monolith comprising a porous substrate and having a first face and a second face defining a longitudinal direction therebetween and first and second pluralities of channels extending in the longitudinal direction,
wherein the first plurality of channels provides a first plurality of inner surfaces and is open at the first face and closed at the second face, and wherein the second plurality of channels is open at the second face and closed at the first face,
wherein a first catalytic material is distributed within the porous substrate,
wherein a microporous membrane is provided in the first plurality of channels on a first portion extending in the longitudinal direction of the first plurality of inner surfaces, and
wherein the first portion extends from the first face for 75 to 95% of a length of the first plurality of channels.

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The present inventors have found that by providing the microporous membranes as discussed herein, it is possible to direct the soot deposition locations. Microporous membranes are coatings which have pores sized to be smaller than the soot particles being recovered. This means that the membrane permits the through-flow of gases for treatment, but prevents the build-up of soot within the larger pores of the porous substrate in areas protected by the membrane. The provision of a microporous membrane therefore prevents the build-up of back pressure in those regions, in use.

The inventors have found that if they control the amount of soot going to the rear of the filter, then when conducting soot regeneration, more soot burns in the front than in the back, based on where it has accumulated in use. Typically in conventional filters, more soot accumulates at the back, leading to a significant temperature gradient and reducing the longevity of the device. Preventing soot deposition at the back of the filter can reduce the temperatures reached in the rear of the filter during regeneration, improving the durability of the filter with respect to filter damage.

Accordingly, the present invention relates to a catalytic wall-flow monolith for use in an emission treatment system. Wall-flow monoliths are well-known in the art for use in diesel particulate filters. They work by forcing a flow of exhaust gases (including particulate matter) to pass through walls formed of a porous material. Preferably the monolith is a filter including an SCR catalyst.

The monolith has a first face and a second face defining a longitudinal direction therebetween. In use, the first face will be the inlet face for exhaust gases and the second face will be the outlet face for the treated exhaust gases.

As is conventional for a wall-flow monolith, it has first and second pluralities of channels extending in the longitudinal direction. The first plurality of channels is open at the first face and closed at the second face. The second plurality of channels is open at the second face and closed at the first face. The channels are preferably parallel to each other to provide a constant wall thickness between the channels. As a result, gases entering one of the plurality of channels cannot leave the monolith without diffusing through the channel walls into the other plurality of channels. The channels are closed with the introduction of a sealant material into the open end of a channel. Preferably the number of channels in the first plurality is equal to the number of channels in the second plurality, and each plurality is evenly distributed throughout the monolith.

The first plurality of channels provides a first plurality of inner surfaces. The second plurality of channels provides a second plurality of inner surfaces.

In order to facilitate the passage of gases to be treated through the channel walls, the monolith is formed out of a porous substrate. The substrate also acts as a support for holding catalytic material. Suitable materials for forming the porous substrate include ceramic-like materials such as cordierite, α-alumina, silicon carbide, silicon nitride, zirconia, mullite, spodumene, alumina-silica-magnesia or zirconium silicate, or porous, refractory metal. Wall-flow substrates may also be formed of ceramic fiber composite materials. Preferred wall-flow substrates are formed from cordierite and silicon carbide. Such materials are able to withstand the environment, particularly the high temperatures, encountered in treating the exhaust streams and can be made sufficiently porous. Such materials and their use in the manufacture of porous monolith substrates is well known in the art.

In order to provide a catalytic wall-flow monolith, catalytic material must be applied to the porous substrate, typically in the form of a washcoat. The application may be characterised as "on wall" application or "in wall" application. The former is characterised by the formation of a coating layer on a surface of a channel, such as the microporous membrane discussed herein. The latter is characterised by the infiltration of catalytic material into the pores within the porous material. The techniques for "in wall" or "on wall" application can depend on the viscosity of the material applied, the application technique (spraying or dipping, for example) and the presence of different solvents. Such application techniques are known in the art. The viscosity of the washcoat is influenced, for example, by its solids content. It is also influenced by the particle size distribution of the washcoat—a relatively flat distribution will give a different viscosity to a finely milled washcoat with a sharp peak in its particle size distribution—and rheology modifiers such as guar gums and other gums. Suitable coating methods are described in WO2011/080525, WO1999/047260 and WO2014/195685, which are incorporated herein by reference.

Catalysts for use as the catalytic materials include zeolites, such as ZSM-5, mordenite, gamma zeolite and beta zeolite or mixtures of any two or more thereof. The zeolite can be metallised or non-metallised e.g. with Fe, V, Cu, Ce, Fe or Pt or any two or more thereof. Where metallised, the metal can be applied using known techniques such as impregnation or ion-exchange. Preferably the monolith is a selective catalytic reductant filter (SCR). Suitable catalysts for $NO_x$ reduction are known in the art, and are described, for example, in WO2009/001131, WO2010/043891 and WO2008/106519. Advantageously, an SCR monolith is able to both reduce $NO_x$ in exhaust streams and remove particulate matter in a single unit.

Preferably the catalytic material comprises a small-pore zeolite. Small pore zeolites with particular application for treating $NO_x$ in exhaust gases of lean-burn combustion engines include zeolites selected from the CHA, LEV, ERI, DDR, KFI, EAB, PAU, MER, AEI, GOO, YUG, GIS, VNI and AFT structural families. Suitable examples are described in WO2008/132452, which is incorporated herein by reference. Small pore zeolites from the CHA and AEI families are especially preferred. The small pore zeolite is preferably metallized with Cu and/or Fe, optionally including Ce. Alternatively, the small pore zeolite may be metallized with precious metals (including gold, silver and platinum-group-metals), preferably with platinum-group-metals, more preferably palladium or platinum, and most preferably palladium.

Preferably the catalytic material is distributed throughout the porous substrate. That is, preferably the catalytic material is preferably uniformly and homogeneously distributed throughout the porous substrate.

In some embodiments, however, the monolith of the present invention has been treated so as to have only a section of the porous substrate filled with catalytic material. In particular there can be a first section extending in the longitudinal direction from the first face and a second section extending in the longitudinal direction from the second face and extending to the first portion. In other words, one end of the monolith (relative to the flow of exhaust gases) forms the first section and the remainder at the other end forms the second section. In these embodiments, the second section contains the catalytic material. Preferably the catalytic material is distributed throughout the second section of the porous substrate. That is, preferably the catalytic material is preferably uniformly and homogeneously distributed throughout the section. In this embodiment, preferably the first section does not contain any catalytic material (or indeed, any added material) within the porous substrate.

Preferably a ratio of a length of the first section in the longitudinal direction to the length of the second section in the longitudinal direction is from 5:95 to 15:85, preferably about 10:90.

Typically the border between the first and second portions will be in a plane parallel to the first and second faces. This facilitates the wash-coating process. However, it is also possible to have a border which varies across the cross-section of the monolith, such as a cone-shaped border. This may advantageously be used to increase the volume of the second portion within the monolith, since a centre portion of the monolith does experience elevated temperatures.

A microporous membrane is provided in the first plurality of channels, coating the first plurality of inner surfaces. Preferably the microporous coating is not provided on the second plurality of surfaces. In the first aspect described herein, the membrane is provided on 75 to 95% of the length of the first channels, preferably 80 to 90%.

This length is the internal length of the cavity from the first face to the internal sealed end of the first plurality of channels. Since the coating extends from the first face, this means that the rear portion of the channels is not coated. According to the second aspect, the plurality of first inner surfaces are fully coated.

The microporous membrane can be made of a variety of materials, including polymeric membranes and inorganic membranes. Inorganic materials which can be used include sintered metals and ceramic membranes. Ceramic membranes can include alumina, zirconia, titania, silica, zircon, cordierite, mullite, spinel, silicon carbide, silicon nitride, and mixtures thereof, bonded by thermal sintering or with a reactive inorganic binder.

The pore size of the microporous membrane is such that the soot particles cannot pass through the membrane. Preferably the mean pore diameter of the membrane coating is from about 0.1 micron to 5 micron, more preferably 0.2 to 1 microns.

The catalyst membrane may be in the form of a permeable, semi-permeable, or non-permeable membrane. As used herein, a membrane is a catalyst coating wherein the thickness of the coating is about 0.1 to 15% of the thickness of the wall upon which the membrane is disposed. A membrane can also contain about 5-40% of the catalyst material based on the total weight of the catalyst material loaded on the filter as a whole.

The membrane may be on the inlet or outlet side of the porous wall. The membrane may cover 100% of the filter length or may cover only 10-90% of the filter length, measured from either in the inlet face or the outlet face. For example, the membrane may cover 10-25%, 25-50%, 50-75%, 35-75%, or 75-70% of the filter length.

In one embodiment, preferably the microporous membrane has a thickness which decreases along the longitudinal direction, such that the thickness is greatest in a region adjacent the first face. The membrane may also comprise a catalyst concentration gradient with the high concentration of catalyst being toward the inlet end of the filter.

It is possible using conventional techniques to provide such "on wall" application as the microporous membrane to only a specific portion of the substrate. For example, a protective polymeric coating (such as polyvinyl acetate) can be applied to the remaining portion so that the membrane does not form there. Once the residual washcoat has been removed, for example under vacuum, the protective polymeric coating may be burnt off.

The microporous membrane can be applied by a spraying or dipping approach, but the material used to form it can be substantially prevented from infiltrating the porous substrate by one of several techniques, such as using a thick and viscous coating solution as described above.

For the avoidance of doubt, it is acknowledged that the microporous coating may extend into a surface region and infiltrate pores close to the surface of the substrate. This may be necessary for the membrane to adhere to the substrate. Preferably the membrane on the surface of the first plurality of channels penetrates to less than 25%, preferably 10%, preferably less than 5% of the channel wall thickness.

Preferably the microporous membrane comprises a second catalytic material different from the first catalytic material, preferably a soot combustion promoter catalyst. Most preferred examples include Cu on Ceria, Ce/Zr, or Ceria.

In certain aspects, the microporous membrane contains a material for adsorbing or otherwise capturing a catalyst poison such as ash, Na, Pt, sulphur oxides, Fe, and the like. One such example is ceria. Another example is bare zeolite (e.g., zeolite in the H-form).

In certain aspects, the microporous membrane contains a catalyst for urea hydrolysis. Suitable coating materials are disclosed in U.S. Pat. No. 8,071,037.

Preferably the mean cross-sectional width of the first and second pluralities of channels, in combination with the porous walls, results in a cell per square inch (CPSI) of 100 to 600. The channels may be of a constant width and each plurality of channels may have a uniform channel width. Preferably, however, the plurality of channels that serves as the inlet in use has a greater mean cross-sectional width than the plurality of channels that serves as the outlet. Preferably, the difference is at least 10%. This affords an increased ash storage capacity in the filter, meaning that a lower regeneration frequency can be used. Asymmetric filters are described in WO 2005/030365, which is incorporated herein by reference.

Preferably the mean minimum thickness of the substrate between adjacent channels (i.e., wall thickness) is from 8 to 20 mil (where a "mil" is $\frac{1}{1000}$ inch) (0.02 to 0.05 cm). Since the channels are preferably parallel and preferably have a constant width, the minimum wall thickness between adjacent channels is preferably constant. As will be appreciated, it is necessary to measure the mean minimum distance to ensure a reproducible measurement. For example, if the channels have a circular cross-section and are closely packed, then there is one clear point when the wall is thinnest between two adjacent channels. The wall thickness is preferably associated with the wall porosity and/or mean pore size. For example, the wall thickness to mean pore size is between 10 and 50.

Preferably within a plane orthogonal to the longitudinal direction, the monolith has from 100 to 500 channels per square inch, preferably from 200 to 400. For example, on the first face, the density of open first channels and closed second channels is from 200 to 400 channels per square inch. The channels can have cross sections that are rectangular, square, circular, oval, triangular, hexagonal, or are of other polygonal shapes.

According to a further aspect there is provided a catalytic wall-flow monolith for use in an emission treatment system, the monolith comprising a porous substrate and having a first face and a second face defining a longitudinal direction therebetween and first and second pluralities of channels extending in the longitudinal direction, wherein the first plurality of channels provides a first plurality of inner surfaces and is open at the first face and closed at the second face, and wherein the second plurality of channels are open at the second face and closed at the first face, wherein a first catalytic material is distributed throughout the porous substrate, wherein a microporous membrane is provided in the first plurality of channels, coating the first plurality of inner surfaces, and wherein the microporous membrane has a thickness which increases along the longitudinal direction, such that the thickness is greatest in a region adjacent the closed second face.

Preferably the microporous membrane has a thickness in the region adjacent the closed second surface such that the backpressure, in use, is at least 20% greater than the backpressure in a region adjacent the first face.

According to a further aspect there is provided an emission treatment system for treating a flow of a combustion exhaust gas, the system comprising the catalytic wall-flow monolith as described herein, wherein the first face is upstream of the second face.

According to a further aspect there is provided a method for the manufacture of a catalytic wall-flow monolith as described herein, the method comprising:

providing a porous substrate having a first face and an second face defining a longitudinal direction therebetween and first and second pluralities of channels extending in the longitudinal direction, wherein the first plurality of channels is open at the first face and closed at the second face, and wherein the second plurality of channels is open at the second face and closed at the first face, wherein the first plurality of channels provide a first plurality of inner surfaces and wherein the second plurality of channels provide a second plurality of inner surfaces;

infiltrating the porous substrate with a washcoat containing a first catalytic material to provide the first catalytic material distributed within the porous substrate; and forming a microporous membrane on the first plurality of inner surfaces.

Selective infiltration of the substrate is possible by immersing the substrate vertically in a portion of the catalyst slurry such that the desired boundary between the first and second substrate portions is at the surface of the slurry. The sample is left in the slurry for about 30 seconds. The substrate is removed from the slurry, and excess slurry is removed from the wall-flow substrate first by allowing it to drain from the channels, then by blowing with compressed air (against the direction of slurry penetration), and then by pulling a vacuum from the direction of slurry penetration. By using this technique, the catalyst slurry permeates the walls of the first portion of the substrate, yet the pores are not occluded to the extent that undue back pressure will build up in the finished substrate.

The coated substrates are dried typically at about 100° C. and calcined at a higher temperature (e. g. 300 to 450° C.). After calcining, the catalyst loading can determined through calculation of the coated and uncoated weights of the substrate. As will be apparent to those of skill in the art, the catalyst loading can be modified by altering the solids content of the coating slurry. Alternatively, repeated immersions of the substrate in the coating slurry can be conducted, followed by removal of the excess slurry as described above.

The coating of the microporous membrane is formed as described above and in WO2011/080525, WO1999/047260 and WO2014/195685. To prevent the coating from forming along the entire length of the channel surfaces, the surface in the first portion may be pre-coated with a protective polymeric film, such as polyvinyl acetate. This prevents the catalytic material from adhering to the surface in the first portion. The protective polymeric coating may then be burnt off.

The present disclosure encompasses, in particular, four preferred embodiments described in detail below.

According to the first preferred embodiment, there is provided a catalytic wall-flow monolith for use in an emission treatment system, the monolith comprising a porous substrate and having a first face and a second face defining a longitudinal direction therebetween and first and second pluralities of channels extending in the longitudinal direction, wherein the first plurality of channels provides a first plurality of inner surfaces and is open at the first face and closed at the second face, and wherein the second plurality of channels is open at the second face and closed at the first face, wherein a first catalytic material is distributed throughout the porous substrate, wherein a microporous membrane is provided in the first plurality of channels on a first portion extending in the longitudinal direction of the first plurality of inner surfaces, and wherein the first portion extends from the first face for 80 to 90% of a length of the first plurality of channels.

By providing the on-wall coating in the form of the microporous membrane, this prevents soot depositing into the wall for a majority of the channels and hence the soot loaded backpressure is lower where there is on-wall coating. The soot in these regions forms a surface layer but does not have the same inhibiting effect on the gas flow. The region in the rear zone does not have a microporous coating so that soot can be deposited in the pores of the walls and this results in a backpressure which is higher in the rear. After initial loading in use, this elevated back pressure reduces the relative amount of soot which will load in the rear portion of the channels. This consequentially reduces the exotherms in that region during active soot regeneration, improving the durability of the filter against cracking/peak temps.

According to the second preferred embodiment, there is provided a catalytic wall-flow monolith for use in an emission treatment system, the monolith comprising a porous substrate and having a first face and a second face defining a longitudinal direction therebetween and first and second pluralities of channels extending in the longitudinal direction, wherein the first plurality of channels provides a first plurality of inner surfaces and is open at the first face and closed at the second face, and wherein the second plurality of channels is open at the second face and closed at the first face, wherein a first catalytic material is distributed throughout the porous substrate, wherein a microporous membrane is provided in the first plurality of channels on a first portion extending in the longitudinal direction of the first plurality of inner surfaces, and wherein the first portion extends from the first face for 75 to 95% of a length of the first plurality of channels, and wherein the microporous membrane has a thickness which decreases along the longitudinal direction, such that the thickness is greatest in a region adjacent the first face.

This embodiment works in a similar way to the first embodiment. The microporous membrane helps to prevent soot going into the wall in the first portion of the channels. However, by providing a decreasing thickness of the microporous membrane, a gradually increasing amount of soot will enter into the porous substrate. This provides an increasing backpressure in the channel 5 towards the back of the channel. This helps to further reduce the temperature gradients which occur on thermal regeneration.

According to the third preferred embodiment, there is provided a catalytic wall-flow monolith for use in an emission treatment system, the monolith comprising a porous substrate and having a first face and a second face defining a longitudinal direction therebetween and first and second pluralities of channels extending in the longitudinal direction, wherein the first plurality of channels provides a first plurality of inner surfaces and is open at the first face and closed at the second face, and wherein the second plurality of channels is open at the second face and closed at the first face, wherein a first catalytic material is distributed within the porous substrate, wherein a microporous membrane is provided in the first plurality of channels on a first portion extending in the longitudinal direction of the first plurality of inner surfaces, and wherein the first portion extends from the first face for 75 to 95% of a length of the first plurality of channels, wherein the porous substrate has a first section extending in the longitudinal direction from the first face and a second section extending in the longitudinal direction from the second face and extending to the first section, and wherein the first catalytic material is distributed throughout the second section and, wherein the ratio of a length of the first section in the longitudinal direction to the length of the second section in the longitudinal direction is from 5:95 to 15:85.

As a result, since the first section has a high porosity the back pressure is very low in this section. Accordingly, soot build up on the surface of the microporous membrane in this section is increased and this, consequentially, reduces the soot loading in the rear portion and results in better durability.

According to the fourth preferred embodiment, there is provided a catalytic wall-flow monolith for use in an emission treatment system, the monolith comprising a porous substrate and having a first face and a second face defining a longitudinal direction therebetween and first and second pluralities of channels extending in the longitudinal direction, wherein the first plurality of channels provides a first plurality of inner surfaces and is open at the first face and closed at the second face, and wherein the second plurality of channels are open at the second face and closed at the first face, wherein a first catalytic material is distributed throughout the porous substrate, wherein a microporous membrane is provided in the first plurality of channels, coating the first plurality of inner surfaces, and wherein the microporous membrane has a thickness which increases along the longitudinal direction, such that the thickness is greatest in a region adjacent the closed second face.

The inventors have found that when the extra on-wall coating is increased in the rear portion beyond the level required to prevent soot deposition, the coating can have a direct effect on increasing the backpressure in the rear portion of the first channels. That is, the thickness of the coating can provide sufficient back-pressure to deter the deposition of soot in the rear portion. In particular, the coating should be sufficient such that the soot loaded back pressure is 20% higher in the rear than the front by virtue of the increased coating thickness in the rear section. This reduces soot deposition towards the rear of the monolith and helps to prevent undue heat build-up in this portion during regeneration.

According to a further aspect there is provided a method for treating a flow of a combustion exhaust gas comprising $NO_x$ and particulate matter, the method comprising passing the exhaust stream through the monolith described herein, wherein the second face is downstream of the first face.

The exhaust systems for the present invention are for internal combustion engines and in particular to lean-burn internal combustion engines, especially diesel engines.

BRIEF DESCRIPTION OF THE DRAWINGS

The invention will now be described in relation to the following non-limiting figures, in which.

DETAILED DESCRIPTION OF THE INVENTION

Figure 1:
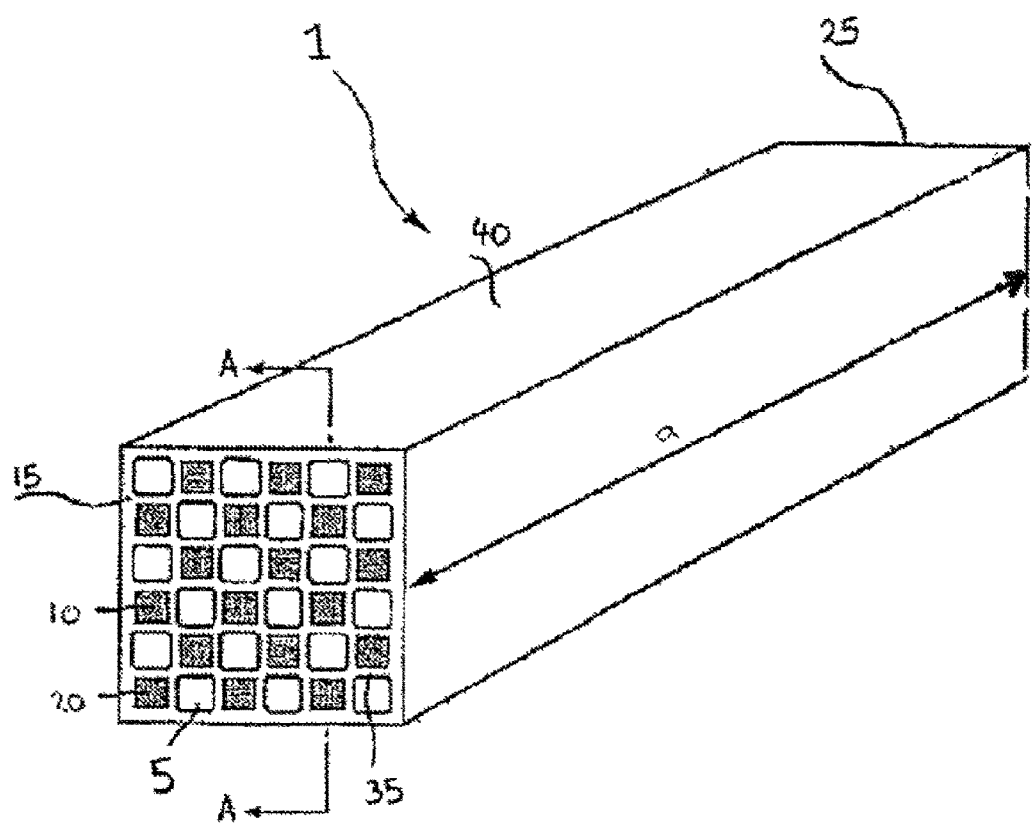
FIG. 1 is a perspective view that schematically shows a wall flow monolith filter 1 according to the present invention.
Figure 2:
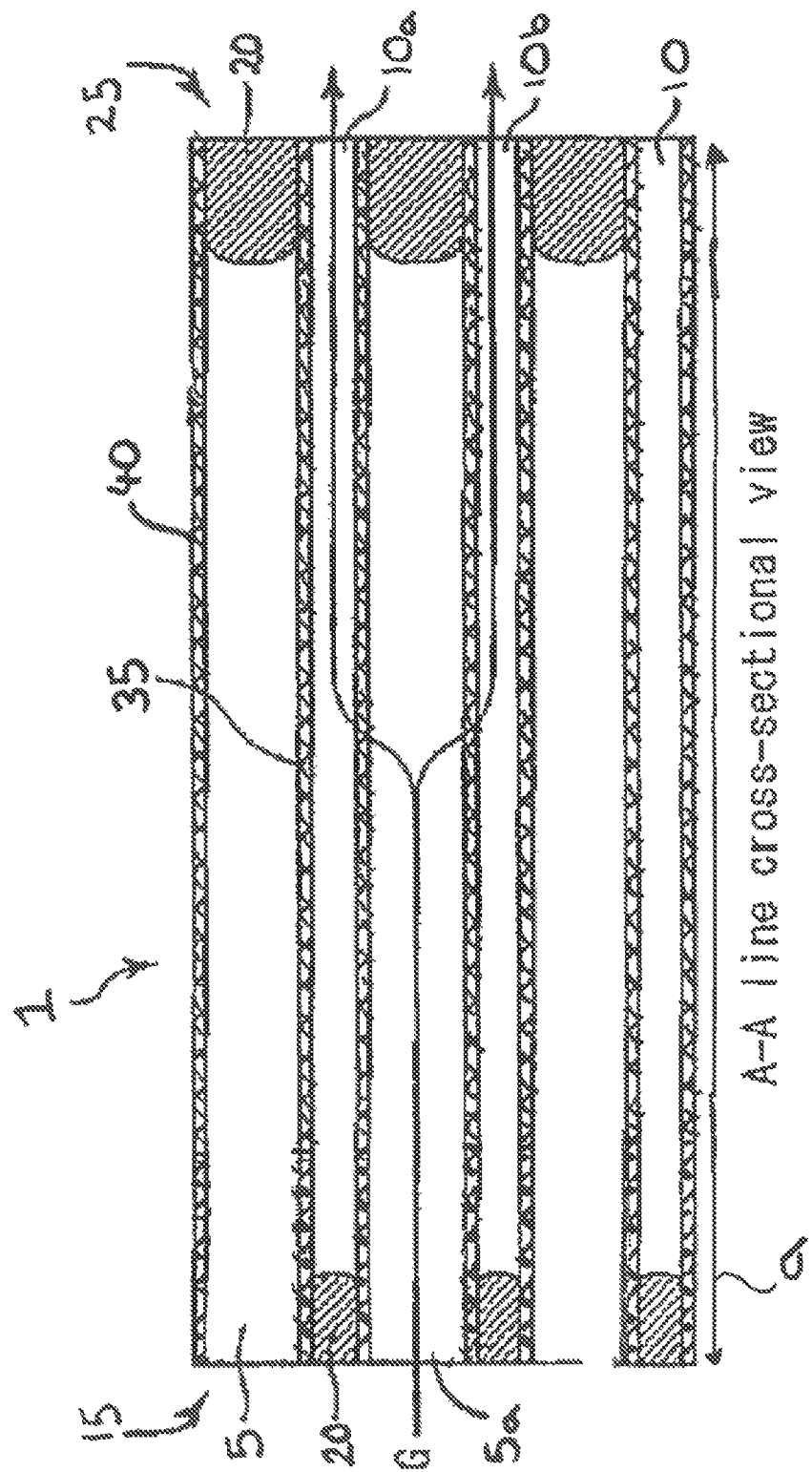
FIG. 2 is an A-A line cross-sectional view of the wall flow monolith filter 1 shown in FIG. 1.

A wall flow monolith 1 according to the present invention is shown in FIG. 1 and FIG. 2. It includes a large number of channels arranged in parallel with each other in the longitudinal direction (shown by a double-sided arrow "a" in FIG. 1A) of the monolith 1. The large number of channels includes a first subset of channels 5 and a second subset of channels 10.

The channels are depicted such that the second subset of channels 10 is narrower than the first subset of channels 5. This has been found to provide an increased ash storage capacity in the filter. However, the channels may alternatively be the same size.

The first subset of channels 5 is open at an end portion on a first end face 15 of the wall flow monolith 1 and is sealed with a sealing material 20 at an end portion on a second end face 25.

On the other hand, the second subset of channels 10 is open at an end portion on the second end face 25 of the wall flow monolith 1 and is sealed with a sealing material 20 at an end portion on the first end face 15.

The porous material 40 of the wall-flow monolith 1 is provided with a catalytic material, such as a zeolite, within pores of the channels walls 35. This may be provided with a washcoat application method, as is known in the art and is discussed elsewhere in the specification. Preferably the catalytic material is distributed throughout the porous material 40, except in certain embodiments as described below.

The channel walls 35 of the first subset of channels 5 are provided with a microporous membrane 36 on at least a portion thereof. The channel walls of the second subset of channels 10 are not coated. FIG. 2 shows how the wall-flow filter works but does not show the microporous membrane 36. Embodiments of the microporous membrane 36 are shown in FIGS. 3A-3C and FIG. 4.

When the wall flow monolith is used for a urea SCR device, exhaust gases G (in FIG. 2, "G" indicates exhaust gases and the arrow indicates a flowing direction of exhaust gases) introduced to the first subset of channels 5 will pass through the channel wall 35 interposed between the channel 5a and the channels 10a and 10b, and then flow out from the monolith 1. Accordingly, particulate matter in exhaust gases is captured by the channel wall 35.

The zeolite supported in the channel wall 35 of the monolith 1 functions as a catalyst for catalytic reduction which acts on $NO_x$ in combination with a reducing agent such as ammonia to reduce $NO_x$ to $N_2$.

Therefore, when the wall flow monolith 1 is used for a urea SCR device, $NO_x$ in exhaust gases is reduced to $N_2$ by the action of the zeolite supported on the cell wall 35 and the action of ammonia derived from urea water sprayed from a urea spray nozzle of the urea SCR device while the exhaust gases pass through the cell wall 35.

Figure 3A:
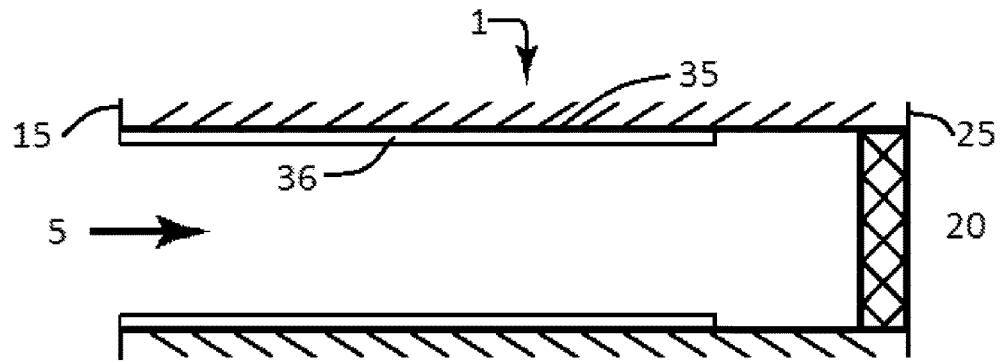
FIG. 3A-C show different embodiments of the position and relative thicknesses of the microporous membrane described herein.

In FIG. 3A the microporous coating is provided on the channel walls 35 of the first subset of channels 5 such that about 90% of the channel length (measured from the first end face 15 to the sealed end of the channel) and starting from the first end face 15 has the microporous coating. The thickness of the coating is substantially uniform.

The inventors have found that by providing the on-wall coating along the channel 5, but for less than the full length of the channel 5, they can affect the build-up of soot within the channel 5. In particular, in a conventional uncoated wall-flow monolith, the soot tends to build up particularly towards the end of the channel. When this is removed by a combustion regeneration step, the presence of the additional soot leads to a steep temperature gradient within the monolith. This leads to cracking and a significant shortening of the effective life of the filter.

By providing the on-wall coating in the form of the microporous membrane 36, this stops soot going into the wall for a majority of the channels and hence the soot loaded backpressure is lower where there is on-wall coating. The soot in these regions forms a surface layer but does not have the same inhibiting effect on the gas flow. The region in the rear zone does not have a microporous coating so that soot can be deposited in the pores of the walls and this results in a backpressure which is higher in the rear. After initial loading, this elevated back pressure reduces the relative amount of soot which will load in the rear portion of the channels 5. This consequentially reduces the exotherms in that region during active soot regeneration, improving the durability of the filter against cracking/peak temps.

Figure 3B:
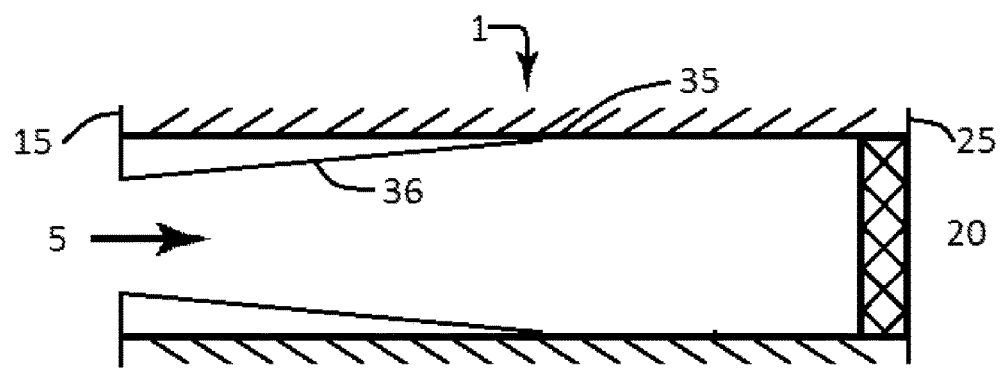

In FIG. 3B the microporous coating is provided on the channel walls 35 of the first subset of channels 5 such that 90% of the channel length (measured from the first end face 15 to the sealed end of the channel) and starting from the first end face 15 has the microporous coating. The thickness of the coating is decreases along the channels 5, such that the coating is thickest close to the first end face 15.

As in the embodiment discussed above, applying the microporous membrane 36 helps to prevent soot going into the wall in the first portion of the channels 5. However, by providing a decreasing thickness of the microporous membrane 36, a gradually increasing amount of soot will enter into the porous substrate. This provides an increasing backpressure in the channel 5 towards the back of the channel. This helps to further reduce the temperature gradients which occur on thermal regeneration.

Figure 3C:
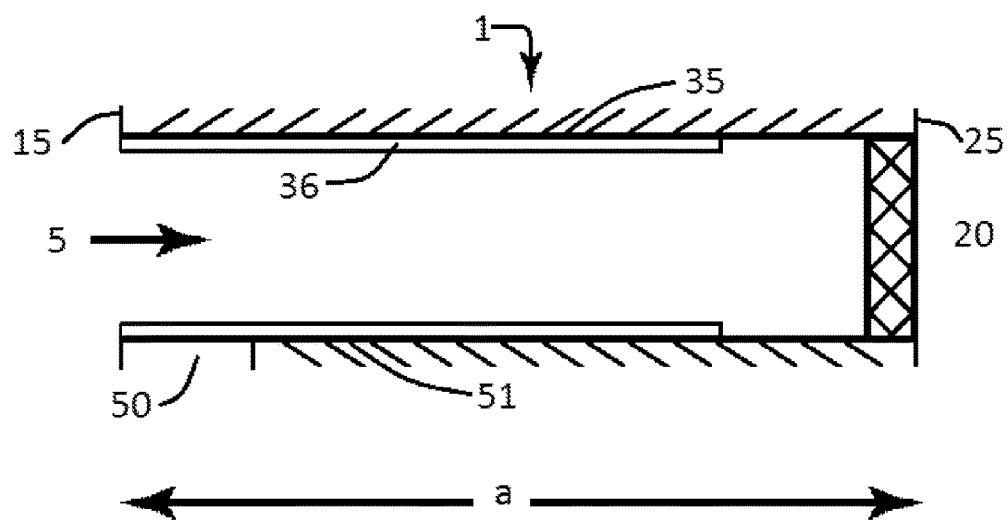

In FIG. 3C the microporous coating is provided on the channel walls 35 of the first subset of channels 5 such that 90% of the channel length (measured from the first end face 15 to the sealed end of the channel) and starting from the first end of the channel 5 has the microporous coating. The thickness of the coating is substantially uniform. However, the porous substrate 40 in this embodiment is divided into two sections. A first section 50 starting from the first face which does not include any catalytic material, and a second section 51 (the remainder) which has the catalytic material distributed throughout.

As a result, since the first section 50 has a high porosity the back pressure is very low. Accordingly, soot build up on the surface of the microporous membrane 36 is increased and this, consequentially, reduces the soot loading in the rear portion and results in better durability.

Figure 4:
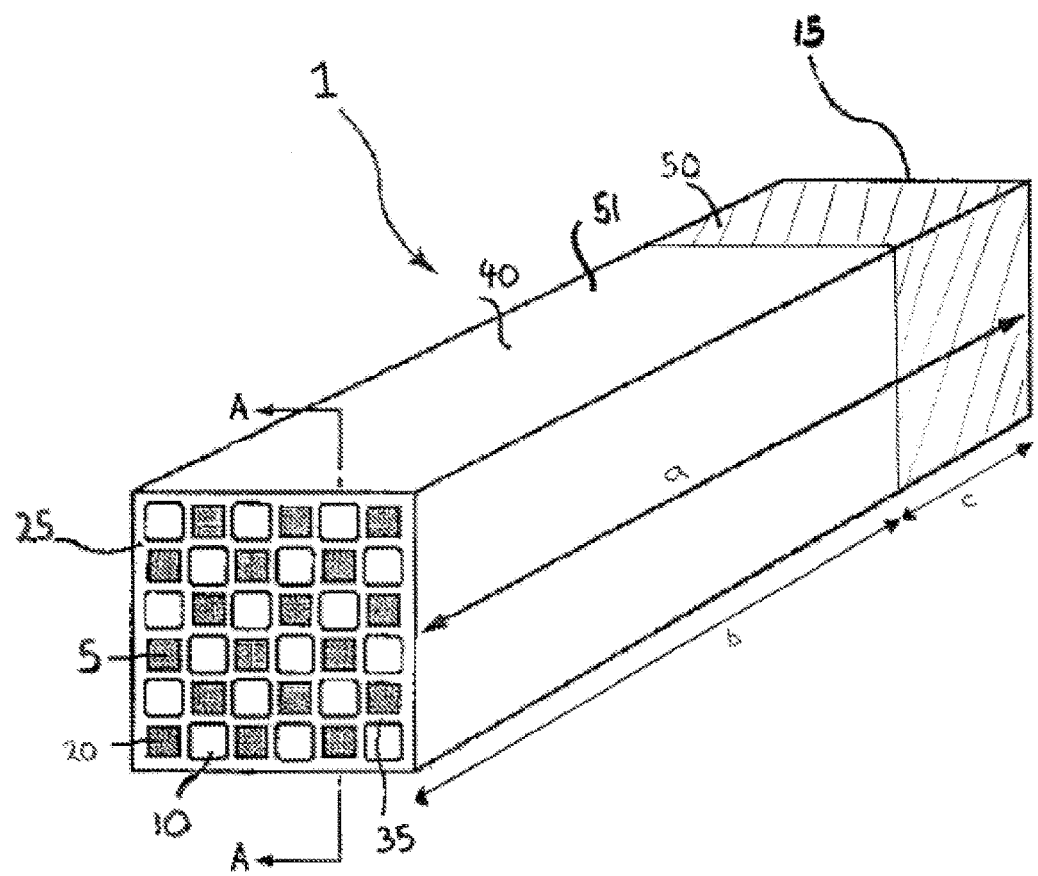
FIG. 4 is a perspective view that schematically shows a wall flow monolith filter 1 according to the present invention.

FIG. 4 is a perspective view that schematically shows a wall flow monolith filter 1 according to the present invention. The wall flow monolith shows the first section 50 and the second section 51.

Figure 5:
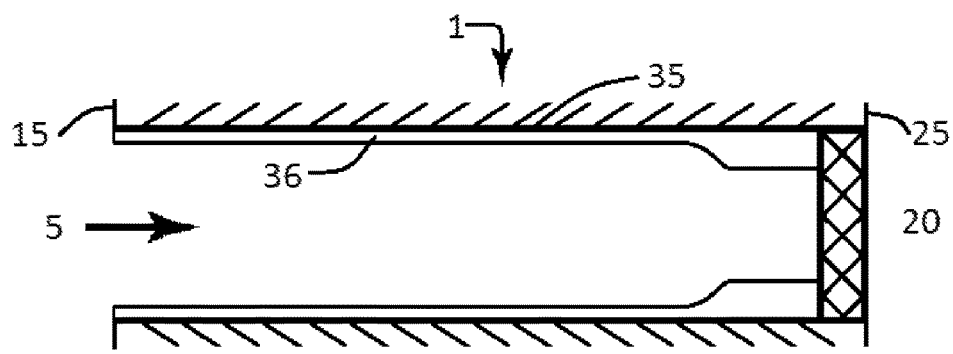
FIG. 5 shows an embodiment of the position and relative thicknesses of the microporous membrane described herein.

In FIG. 5 the microporous coating is provided on the channel walls 35 of the first subset of channels 5 such that 100% of the channel length (measured from the first end face 15 to the sealed end of the channel) has the microporous coating. The thickness of the coating on the channels 5 is such that the coating is thickest close to the closed second end face 25. The catalytic material is distributed throughout the porous material.

The inventors have found that when the extra on-wall coating is increased in the rear portion beyond the level required to prevent soot deposition, the coating can have a direct effect on increasing the backpressure in the rear portion of the first channels. In particular, the coating should be sufficient such that the soot loaded back pressure is 20% higher in the rear than the front by virtue of the increased coating thickness in the rear section. This reduces soot deposition towards the rear of the monolith and helps to prevent undue heat build-up in this portion during regeneration.

Figure 6:
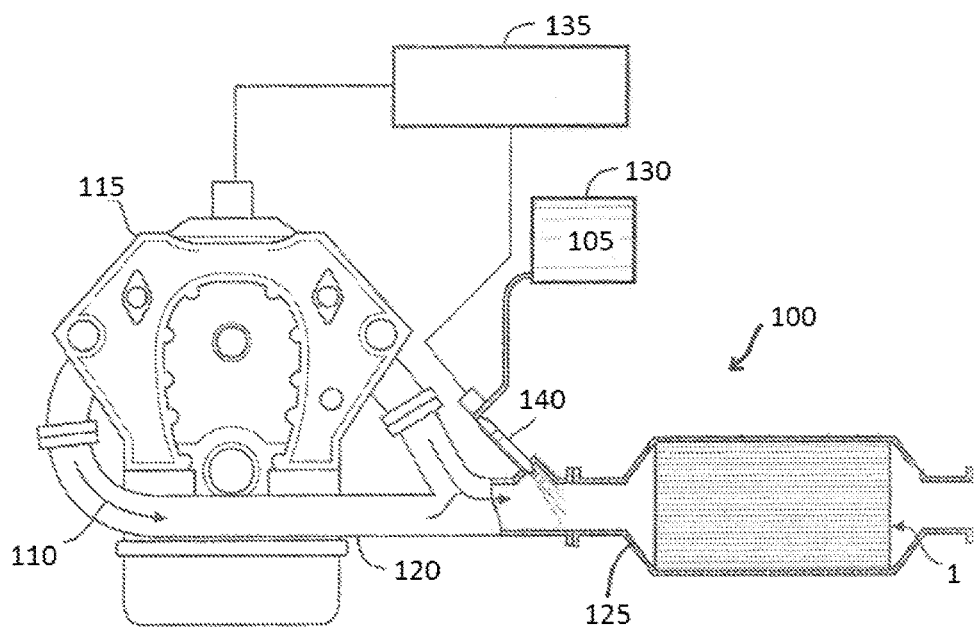
FIG. 6 shows a schematic diagram of an exhaust gas treatment system for a diesel engine.

In the embodiment of the exhaust gas treatment system 100 shown in FIG. 6 an ammonia reductant 105 is injected into the flow of exhaust gas 110 upstream of the wall flow monolith 1. The exhaust gas 110 is passed from the engine 115 through ducting 120 to the exhaust system 125. The ammonia reductant 105 is dispensed from a reservoir 130 as required (as determined by controller 135) through an injection nozzle 140 and mixes with the exhaust gas prior to reaching the monolith 1 which acts as an SCR device.

It should be noted that the wall flow monolith is described herein as a single component. Nonetheless, when forming an emission treatment system, the monolith used may be formed by adhering together a plurality of channels or by adhering together a plurality of smaller monoliths as described herein. Such techniques are well known in the art, as well as suitable casings and configurations of the emission treatment system.

The membrane may be on the inlet or outlet side of the porous wall. The membrane may cover 10-90% of the filter length, measure from either in the inlet face or the outlet face. For example, the membrane may cover 10-25%, 25-50%, 50-75%, 35-75%, or 75-70% of the filter length.

The catalytic and/or adsorbent material of the membrane may comprise an SCR catalyst as defined here, a NOx trap, a soot oxidation catalyst, a hydrolysis catalyst, an adsorbent for metals such as V, Pt, Pd, Rh, Ru, Na, Cu, Fe, Co, Nu, and Cr, or for other poisons such as ash and/or sulphur oxides. Examples of catalytic and/or adsorbent materials include metal loaded zeolites, such as Cu/CHA, Cu/AEI, Fe/CHA, Pd/CHA, and the like, H-form zeolites, supported platinum group metals, etc.

Preferably, the membrane is applied as a catalyst washcoat that contains the catalyst and optionally one or more other constituents such as binders (e.g., metal oxide particles), fibers (e.g., glass or ceramic non-woven fibers), masking agents, rheology modifiers, and pore formers.

All or any combination of these features in a membrane can improve soot-loaded backpressure (particularly in combination with filter efficiency), reduce exotherms during filter regeneration, improve filter thermal and mechanical durability (e.g. avoid cracking, peeling, etc.), protect temperature sensitive catalyst from high temperature spike, improve catalyst performance overall and on per weight basis, lower N2O formation, allows better NH3 utilization, and capture poisons such as Pt, ash, sulfur oxides, Na, Fe, and mitigate the potential loss of metals via volatilization.

Although preferred embodiments of the invention have been described herein in detail, it will be understood by those skilled in the art that variations may be made thereto without departing from the scope of the invention or of the appended claims.

The invention claimed is:

1. A catalytic wall-flow monolith for use in an emission treatment system, the monolith comprising a porous substrate and having a first face and a second face defining a longitudinal direction therebetween and first and second pluralities of channels extending in the longitudinal direction,
   wherein the first plurality of channels provides a first plurality of inner surfaces and is open at the first face and closed at the second face, and wherein the second plurality of channels is open at the second face and closed at the first face,
   wherein a first catalytic material is distributed within the porous substrate,
   wherein a microporous membrane is provided in the first plurality of channels on a first portion, extending in the longitudinal direction, of the first plurality of inner surfaces, and
   wherein the first portion extends from the first face for 75 to 95% of a length of the first plurality of channels, wherein the length is the internal length of a cavity from the first face to the internal sealed end of the first plurality of channels.

2. The catalytic wall-flow monolith according to claim 1, wherein the first portion extends 80 to 90% of a length of the first plurality of channels.

3. The catalytic wall-flow monolith according to claim 1, wherein the microporous membrane has a thickness which decreases along the longitudinal direction, such that the thickness is greatest in a region adjacent the first face.

4. The catalytic wall-flow monolith according to claim 1, wherein the porous substrate has a first section extending in the longitudinal direction from the first face and a second section extending in the longitudinal direction from the second face and extending to the first section, and wherein the first catalytic material is distributed throughout the second section.

5. The catalytic wall-flow monolith according to claim 4, wherein a ratio of a length of the first section in the longitudinal direction to the length of the second section in the longitudinal direction is from 5:95 to 15:85.

6. An emission treatment system for treating a flow of a combustion exhaust gas, the system comprising the catalytic wall-flow monolith according to claim 1, wherein the second face is downstream of the first face.

7. A method for the manufacture of a catalytic wall-flow monolith according to claim 1, the method comprising:
provide a porous substrate having a first face and an second face defining a longitudinal direction therebetween and first and second pluralities of channels extending in the longitudinal direction, wherein the first plurality of channels is open at the first face and closed at the second face, and wherein the second plurality of channels is open at the second face and closed at the first face, wherein the first plurality of channels provide a first plurality of inner surfaces and wherein the second plurality of channels provide a second plurality of inner surfaces,
infiltrating the porous substrate with a washcoat containing a first catalytic material to provide the first catalytic material distributed within the porous substrate; and
forming a microporous membrane on the first plurality of inner surfaces.

8. A method for treating a flow of a combustion exhaust gas comprising $NO_x$ and particulate matter, the method comprising passing the exhaust stream through the monolith of claim 1, wherein the second face is downstream of the first face.

* * * * *